United States Patent
Nilsen

(10) Patent No.: US 10,691,487 B2
(45) Date of Patent: Jun. 23, 2020

(54) ABSTRACTION OF SPIN-LOCKS TO SUPPORT HIGH PERFORMANCE COMPUTING

(71) Applicant: International Business Machines Corporation, Armonk, NY (US)

(72) Inventor: Kelvin D. Nilsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/962,187

(22) Filed: Apr. 25, 2018

(65) Prior Publication Data

US 2019/0332446 A1    Oct. 31, 2019

(51) Int. Cl.
| | | |
|---|---|---|
| *G06F 9/48* | (2006.01) | |
| *G06F 9/52* | (2006.01) | |
| *G06F 11/07* | (2006.01) | |
| *G06F 11/14* | (2006.01) | |
| *G06F 16/176* | (2019.01) | |

(52) U.S. Cl.
CPC .............. *G06F 9/4812* (2013.01); *G06F 9/48* (2013.01); *G06F 9/4825* (2013.01); *G06F 9/524* (2013.01); *G06F 9/526* (2013.01); *G06F 11/0772* (2013.01); *G06F 11/1479* (2013.01); *G06F 16/1774* (2019.01); *G06F 2209/481* (2013.01)

(58) Field of Classification Search
None
See application file for complete search history.

(56) References Cited

U.S. PATENT DOCUMENTS

| | | | |
|---|---|---|---|
| 5,875,342 A * | 2/1999 | Temple | G06F 13/24 710/260 |
| 5,937,199 A * | 8/1999 | Temple | G06F 13/24 710/262 |
| 6,438,573 B1 | 8/2002 | Nilsen | |
| 6,622,189 B2 | 9/2003 | Bryant et al. | |
| 7,162,666 B2 | 1/2007 | Bono | |
| 7,165,254 B2 | 1/2007 | Yoshida | |
| 8,387,075 B1 | 2/2013 | McCann et al. | |
| 8,707,315 B2 | 4/2014 | Koning et al. | |
| 8,713,262 B2 | 4/2014 | Overby et al. | |
| 9,063,796 B2 | 6/2015 | Giusto et al. | |
| 9,081,629 B2 | 7/2015 | Levine | |

(Continued)

OTHER PUBLICATIONS

"Ada Reference Manual", ISO/IEC 8652:1995(E) with COR. 1:2000, Language and Standard Libraries, Copyright © 2000 The MITRE Corporation, Inc., 582 pages, <http://www.adaic.org/resources/add_content/standards/95Irm/RM.pdf>.

(Continued)

*Primary Examiner* — Qing Yuan Wu
(74) *Attorney, Agent, or Firm* — Jay Wahlquist

(57) ABSTRACT

A method comprises receiving a non-privileged disable interrupts instruction from a user application executing in user space, the non-privileged disable interrupts instruction having an operand with a non-zero value; determining a value in a special purpose register associated with disabling interrupts; and in response to determining that the value in the special purpose register associated with disabling interrupts is zero, disabling interrupts and placing the non-zero value of the operand in the special purpose register associated with disabling interrupts.

25 Claims, 9 Drawing Sheets

(56) References Cited

U.S. PATENT DOCUMENTS

| | | |
|---|---|---|
| 2006/0143511 A1 | 6/2006 | Huemiller, Jr. |
| 2011/0099551 A1* | 4/2011 | Fahrig .................. G06F 9/5038 718/102 |
| 2015/0254113 A1 | 9/2015 | Chiang et al. |
| 2016/0132435 A1 | 5/2016 | Gong |
| 2017/0242736 A1 | 8/2017 | Srivastava et al. |

OTHER PUBLICATIONS

"Power Architecture™ Technology Primer", NXP, freescale semiconductor, Document No. PWRARCPRMRM, Rev. 1, May 2007, 54 pages, <freescale.com/powerarchitecture>.

"Power ISA™", Version 3.0 B, IBM, Mar. 29, 2017, 1258 pages.

Afshar, et al., "An Implementation of the Flexible Spin-Lock Model in ERIKA Enterprise on a Multi-Core Platform", Ospert 2016—12th annual workshop on Operating Systems Platforms for Embedded Real-Time applications, Jul. 5-8, 2016, pp. 55-60.

Belliardi, et al., "The Real-Time Specification for Java™", Version 1.0.2, Copyright © 2006 TimeSys Corp., 552 pages, <http://www.rtsj.org/docs/rtsj_1.0.2_spec.pdf>.

Biondi, et al., "A Blocking Bound for Nested FIFO Spin Locks", 2016 IEEE Real-Time Systems Symposium (RTSS), Nov. 29-Dec. 2, 2016, Porto, Portugal, 39 pages.

Cakarevic, et al., "Understanding the Overhead of the Spin-Lock Loop in CMT Architectures", WIOSCA '08: In Procs. of Workshop on the Interaction between Operating Systems and Computer Architecture, 10 pages.

Gunther, Neil J., "A General Theory of Computational Scalability Based on Rational Functions", Cornell University Library, Aug. 25, 2008, pp. 1-14, <https://arxiv.org/abs/0808.1431>.

Sha, et al., "Priority Inheritance Protocols: An Approach to Real-Time Synchronization", IEEE Transactions on Computers, vol. 39, No. 9, Sep. 1990, pp. 1175-1185.

Wieder, et al., "On Spin Locks in AUTOSAR: Blocking Analysis of FIFO, Unordered, and Priority-Ordered Spin Locks", 2013 IEEE 34th Real-Time Systems Symposium (RTSS), Dec. 3-6, 2013, Vancouver, BC, Canada, 12 pages.

\* cited by examiner

ABSTRACTION OF SPIN-LOCKS TO SUPPORT HIGH PERFORMANCE COMPUTING

BACKGROUND

Many computing systems make use of parallel computing to enhance computing performance, such as by breaking down a computation task into several subtasks that can be processed independently and whose results are combined upon completion. Examples of common parallel computing systems include multi-processor computers and computers with multi-core processors. In order to make use of the enhanced performance, software can be divided into many independent executing threads, each running in parallel on separate processing elements.

While parallel computing can enhance performance, additional overhead is introduced in order to coordinate efforts between the separately executing threads. One mechanism to communicate and coordinate between threads is to pass information in shared memory locations. Approaches based on shared memory typically include some form of locking protocol to enable individual threads to know the status of the data read from shared memory locations.

One approach to locking access to the shared memory location is to involve the operating system to place threads that are requesting access to a contended lock into a suspended state so that other threads can be scheduled to run. However, the use of the operating system in implementing thread locks can cost a significant number of machine cycles in overhead which, in turn, can degrade performance.

SUMMARY

Aspects of the disclosure may include a computer implemented method, computer program product, and system. One example of a method comprises receiving a non-privileged disable interrupts instruction from a user application executing in user space, the non-privileged disable interrupts instruction having an operand with a non-zero value; determining a value in a special purpose register associated with disabling interrupts; and in response to determining that the value in the special purpose register associated with disabling interrupts is zero, disabling interrupts and placing the non-zero value of the operand in the special purpose register associated with disabling interrupts.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
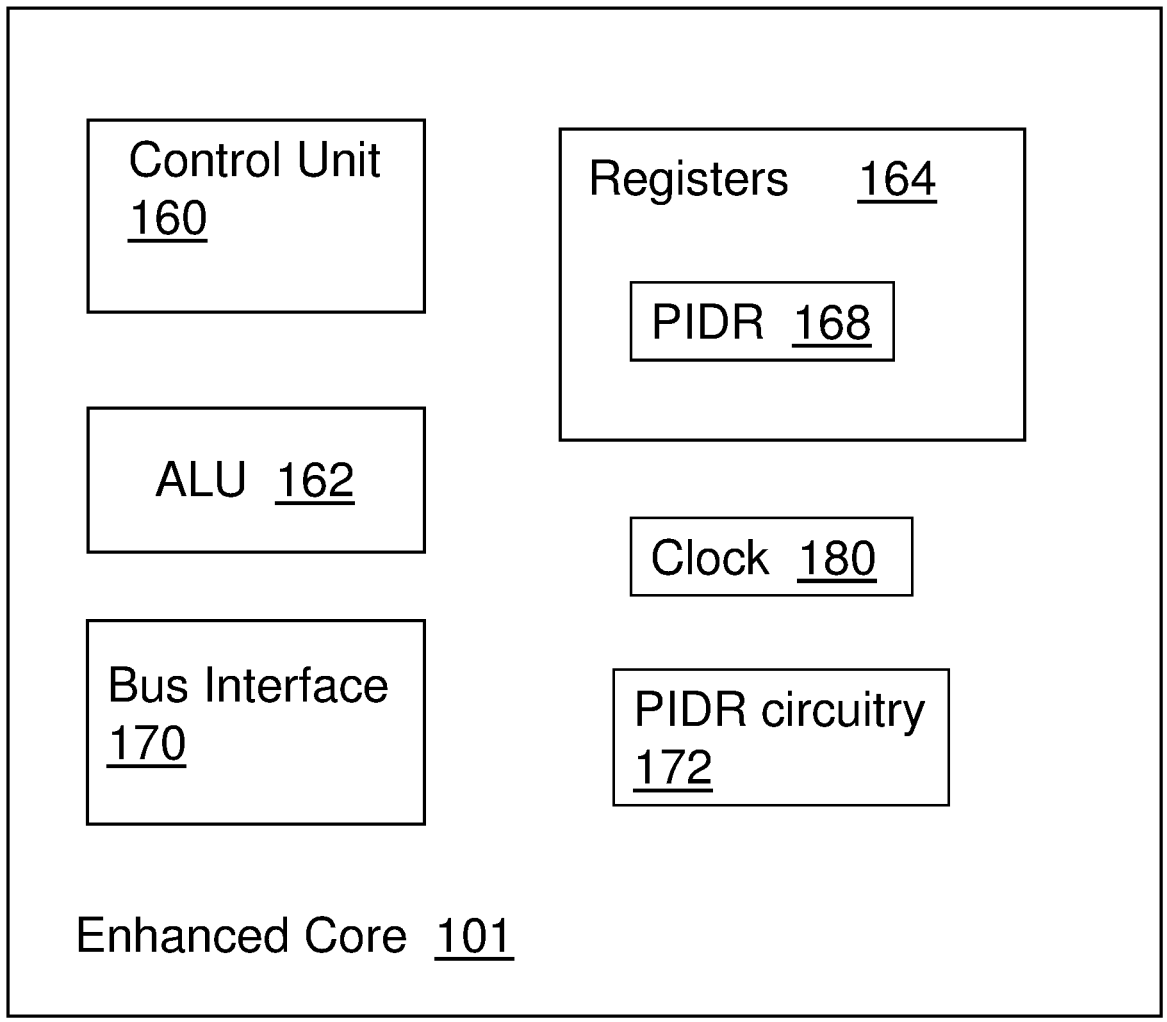
FIG. 1 is a high-level block diagram of one embodiment of an example enhanced core.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

An alternative approach to using an operating system to implement thread locks is to use special instructions implemented in a computer system to coordinate access to shared resources. This type of special instructions is commonly known as a spin-lock. Generally, a spin-lock (also referred to as a spinlock) is a lock which causes a thread trying to acquire it to wait in a loop or spin until the lock becomes available. Specific implementations of a spin-lock in software depend on capabilities of the underlying hardware. Common approaches known to one of skill in the art make use of instructions with names such as test-and-set, compare-and-swap, or load-with-reservation-and-store-conditional.

Because spin-locks avoid overhead from involving the operating system scheduling process to implement a lock, spin-locks can be an efficient technique for implementing thread locks to shared resources. However, spin-locks are used primarily in kernel code. As understood by one of skill in the art, kernel code refers to a computer program that is part of the core of a computer's operating system and connects application software with hardware of the computer. Thus, generally speaking, kernel code has access to or control over everything in the system. For this reason, it is generally not desirable to grant user or third-party applications running in user space privileged access to the kernel code. In particular, granting privileged access to user applications presents a security risk due to both intentional acts as well as unintended mistakes which can result in compromising the operating system and/or other user applications. As understood by one of skill in the art, user space refers to the memory area where application software executes and is separated from kernel space which is the memory area where the kernel code is executed. As stated above, this separation provides memory protection and hardware protection from malicious or errant software behavior.

For various reasons, it is very difficult to use spin-locks effectively in application code running in user space without using privileged instructions having access to kernel space. For example, the operating system is not aware that a particular thread holds a spin-lock or that other threads may be attempting to acquire the same spin-lock. Additionally, if a first thread holding the spin-lock is preempted by a higher priority thread while the first thread holds the spin-lock, all other threads that are attempting to acquire the same spin-lock will continue to spin doing useless work until the first lock is again scheduled for execution and can complete and release the spin-lock. This results in preventing the threads from making meaningful progress until the first thread releases the lock. Additionally, this situation can create interference and degrade performance of other threads working on unrelated activities. For example, because the spin-lock machine instructions impose a workload on the shared memory interconnection bus, when multiple threads repeatedly execute spin-lock instructions in a tight loop, considerable shared memory interconnection bus traffic can be created which can degrade performance of other unrelated threads accessing the shared memory interconnection bus.

Another difficulty in implementing spin-locks in user space is related to a concept known as unbounded priority inversion. For example, if a low-priority thread acquires a spin-lock and is subsequently preempted by a medium priority thread which runs continuously, the low priority thread is unable to proceed to the point of releasing the lock. If a high priority thread then attempts to access the spin-lock held by the low priority thread, the high priority thread becomes blocked and execution of the high priority thread cannot continue until the medium priority thread finishes and allows the low priority thread to release the spin-lock. Because spin-locks are not visible to the operating system, common mechanisms to avoid priority inversion, such as priority inheritance, cannot be used as the operating system is not aware that a spin-lock is held by a low priority thread.

The above considerations present an impediment to implementing spin-locks with user applications running in user space. In particular, for time-critical software where tasks need to be completed within a bounded time frame, the inability to prevent such problems as unbounded priority inversion is an obstacle to implementing spin-locks, and their resultant benefits, in user applications running in user space.

The embodiments described herein enable the use of spin-locks in user or third-party applications running in user space without granting privileged access to kernel space. In particular, as described in more detail below, the embodiments described herein introduce novel non-privileged instructions that allow user code running in user space to inhibit interrupts for a bounded period of time without requiring a call to the operating system. As used herein a non-privileged instruction is an instruction which does not require access to the kernel space to execute and can be executed from user space. By enabling user code to temporarily inhibit interrupts, spin-locks can be implemented by user code without running the risk of unbounded priority inversion discussed above. In other words, by temporarily inhibiting interrupts, an application is assured that the thread will not be preempted while holding the spin-lock.

FIG. 1 is a high-level block diagram of one embodiment of an example enhanced core 101 configured to enable the non-privileged instruction to temporarily inhibit interrupts. The enhanced core 101 can be implemented as a core in a single core or multi-core processor. It is to be understood that the components of enhanced core 101 depicted in FIG. 1 are presented by way of example only and that other components, such as a float pointing unit (FPU), can be included in other embodiments, as understood by one of skill in the art.

In the example of FIG. 1, the enhanced core 101 includes a control unit 160, an arithmetic logic unit (ALU) 162, a bus interface 170, and registers 164. As understood by one of skill in the art, the control unit 160 generates signals that control the other components of the core 101 to carry out actions specified by instructions. For example, the control unit 160 determines when it is time to fetch an instruction/data, decode an instruction, and execute an instruction. The control unit 160 can be implemented as a finite-state machine and can contain decoders, multiplexer, and other logic components.

The ALU 162, as known to one of skill in the art, is a device that performs arithmetic and logic operations on groups of bits, such as addition, subtraction, comparison, etc. The bus interface 170 connects the core 101 to other components of a computer, such as memory and Input/Output (I/O) devices. For example, the bus interface 170 can contain circuitry to place addresses on an address bus, read and write data on a data bus, and read and write signals on a control bus, as known to one of skill in the art.

Registers 164 provide storage space for data and other information for the performance of tasks, as known to one of skill in the art. As known to one of skill in the art, registers 164 can include general purposes registers, such as, data registers used to store data for arithmetic, logical and other operations, pointer registers used to point to an address or location in memory, and index registers used for indexed addressing. Registers 164 can also include special purpose registers which have a specific defined function for operation of the processor core, as known to one of skill in the art. For example, special purpose registers can include condition code or flag registers used to contain various types of the conditions codes during operations and a program counter used to point to the current or next instruction being executed, as known to one of skill in the art.

The enhanced core 101 includes a new special purpose register referred to herein as Processor Interrupts Disabled Register (PIDR) 168. The PIDR 168 is a countdown register used to limit how long interrupts can be disabled, as described in more detail below. The instruction set architecture of the enhanced core 101 is modified to include one or more new instructions, referred to herein as non-privileged interrupts instructions. Thus, the control unit 160 is modified to decode the new non-privileged interrupts instructions into corresponding steps to control and coordinate components of the enhanced core 101 to carry out the functionality of the non-privileged interrupts instructions.

In some embodiments, two new non-privileged interrupts instructions are implemented. The first non-privileged interrupts instruction is a non-privileged disable interrupts instruction and the second non-privileged interrupts instructions is a non-privileged enable interrupts instruction. As described in more detail below, the enhanced core 101 is configured to disable interrupts in response to receiving the non-privileged disable interrupts instruction. Similarly, as described in more detail below, the enhanced core 101 is configured to enable interrupts in response to receiving the non-privileged enable interrupts instruction.

In some embodiments, the non-privileged enable interrupts instruction and the non-privileged disable interrupts instruction are implemented using separate and distinct instructions. In other embodiments, the non-privileged interrupts instructions (e.g. the non-privileged enable interrupts instruction and the non-privileged disable interrupts instruction) are implemented using a single non-privileged interrupts instruction having different operand values. In other words, in such embodiments, the operand value distinguishes the single non-privileged interrupts instruction as a non-privileged enable interrupts instruction or as a non-privileged disable interrupts instruction. Thus, in such embodiments, the enhanced core 101 is configured to analyze the value of the operand in the single non-privileged interrupts instruction to identify it as a non-privileged enable interrupts instruction or a non-privileged disable interrupts instruction.

For example, in some embodiments, if the operand value is zero, then the single non-privileged interrupts instruction is a non-privileged enable interrupts instruction and the enhanced core 101 enables interrupts. Additionally, in some embodiment, if the operand value is non-zero, then the single non-privileged interrupts instruction is a non-privileged disable interrupts instruction and the enhanced core 101 disables interrupts. Although a zero operand value is used to distinguish the functionality of the single non-privileged interrupts instruction in the embodiments discussed herein, it is to be understood that in other embodiments, other specific values can be used to distinguish the functionality of the single non-privileged interrupts instruction. For example, a specific value other than zero, such as the maximum value which can be represented by the operand, can be reserved to indicate that the single non-privileged interrupts instruction is a non-privileged enable interrupts instruction.

Therefore, as used herein, the terms "non-privileged enable interrupts instruction" and "non-privileged disable interrupts instruction" can refer to either two separate and distinct non-privileged instructions or to a single non-privileged instruction whose function is determined based upon a value of its operand.

In embodiments using a single non-privileged instruction as well as embodiments using two separate and distinct non-privileged instructions, the respective non-privileged interrupts instructions can include an operand. In some embodiments, the non-privileged interrupts instructions expect an immediate mode operand of a predetermined size. The predetermined size can be 6 bits, 8 bits, 16 bits, etc. In some embodiments, the operand value is an unsigned value. In executing the new non-privileged disable interrupts instruction, the enhanced core 101 places the operand value into the PIDR 168. The value placed in the PIDR 168 represents a conservative estimate of the amount of time that interrupts need to be disabled. Additional details regarding operation of the enhanced core 101 with respect to receiving a non-privileged interrupts instruction is discussed in more detail below with respect to FIG. 6 and FIG. 7.

The enhanced core 101 also include PIDR circuitry 172. When a non-zero value is placed into the PIDR 168 and interrupts are disabled, PIDR circuitry 172 periodically decrements the PIDR 168. For example, in some embodiments, the PIDR circuitry 172 can decrement the value in the PIDR 168 with each clock cycle measured by clock 180 until the PIDR 168 reaches a zero value. When the PIDR 168 reaches zero, the PIDR circuitry 172 enables interrupts and, in some embodiments, causes an error message to be output indicating that the software application which issued the non-privileged disable interrupts instruction exceeded the amount of time allocated by the operand value of the non-privileged disable interrupts instruction for disabling interrupts. Additional details regarding functionality of PIDR circuitry 172 are described in more detail below with respect to FIG. 7. The PIDR circuitry 172 can be comprised of circuitry components individually known to one of skill in the art, such as, but not limited to, AND, OR, and NOT gates.

In some embodiments, the frequency with which the PIDR circuitry 172 decrements the PIDR 168 is fixed. In other embodiments, the frequency with which the PIDR circuitry 172 decrements the value of the PIDR 168 is scaled proportionally to the clock rate of the clock 180. For example, the enhanced core 201 of FIG. 2 depicts one embodiment in which the frequency with which the PIDR 168 is decremented is proportional to the clock rate.

Figure 2:
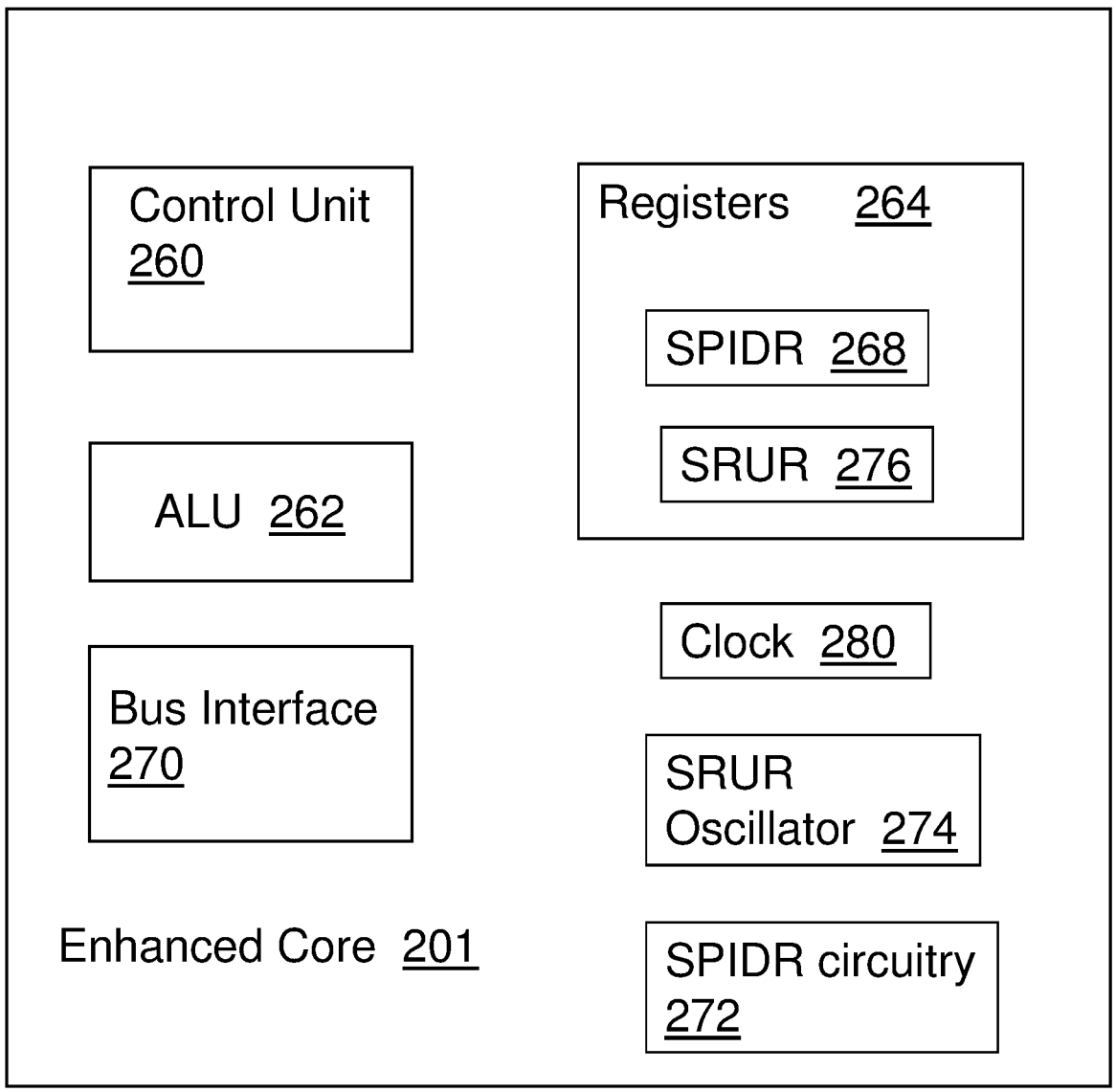
FIG. 2 is a high-level block diagram of another embodiment of an example enhanced core.

FIG. 2 is a high level block diagram of another embodiment of an example enhanced core 201. The enhanced core 201 is similar to enhanced core 101 discussed above. For example, the control unit 260, arithmetic logic unit (ALU) 262, bus interface 270, clock 280 and registers 164 function similarly to the corresponding components discussed above with respect to FIG. 1. In addition, the enhanced core 201 includes a new Processor Interrupts Disabled Register (PIDR) 268, a Scaled Resource Usage Register (SRUR) 276, a SRUR oscillator 274, and PIDR circuitry 272.

The SRUR 276 is a register used to represent an estimate of the number of central processing unit (CPU) time cycles consumed by a running thread. For example, one implementation of SRUR 276 is the Scaled Processor Utilization of Resources Register (SPURR) utilized in some versions of Power Architecture® processors. The SRUR oscillator 274 triggers increments of the value of the SRUR 276. The value of the SRUR 276 is scaled in that the frequency of the SRUR oscillator 274 which triggers increments is proportional to the clock rate of the clock 280. Thus, if the clock rate is slowed, such as to reduce power consumption or processor overheating, the frequency of the SRUR oscillator 276 is reduced proportionally.

The enhanced core 201 also includes PIDR circuitry 276. The PIDR circuitry 272 performs the same functionality as PIDR circuitry 172. Additionally, the PIDR 268 is a countdown register used to limit how long interrupts can be disabled similar to the PIDR 168. However, the value of PIDR 268 is scaled. In particular, PIDR circuitry 272 is configured to increment the PIDR 268 in lock-step with each increment of the SRUR 276. Thus, the value of the PIDR 268 is scaled similar to the value of the SRUR 276. Thus, the PIDR 268 can also be referred to as Scaled PIDR (SPIDR) when the value is scaled.

Figure 3:
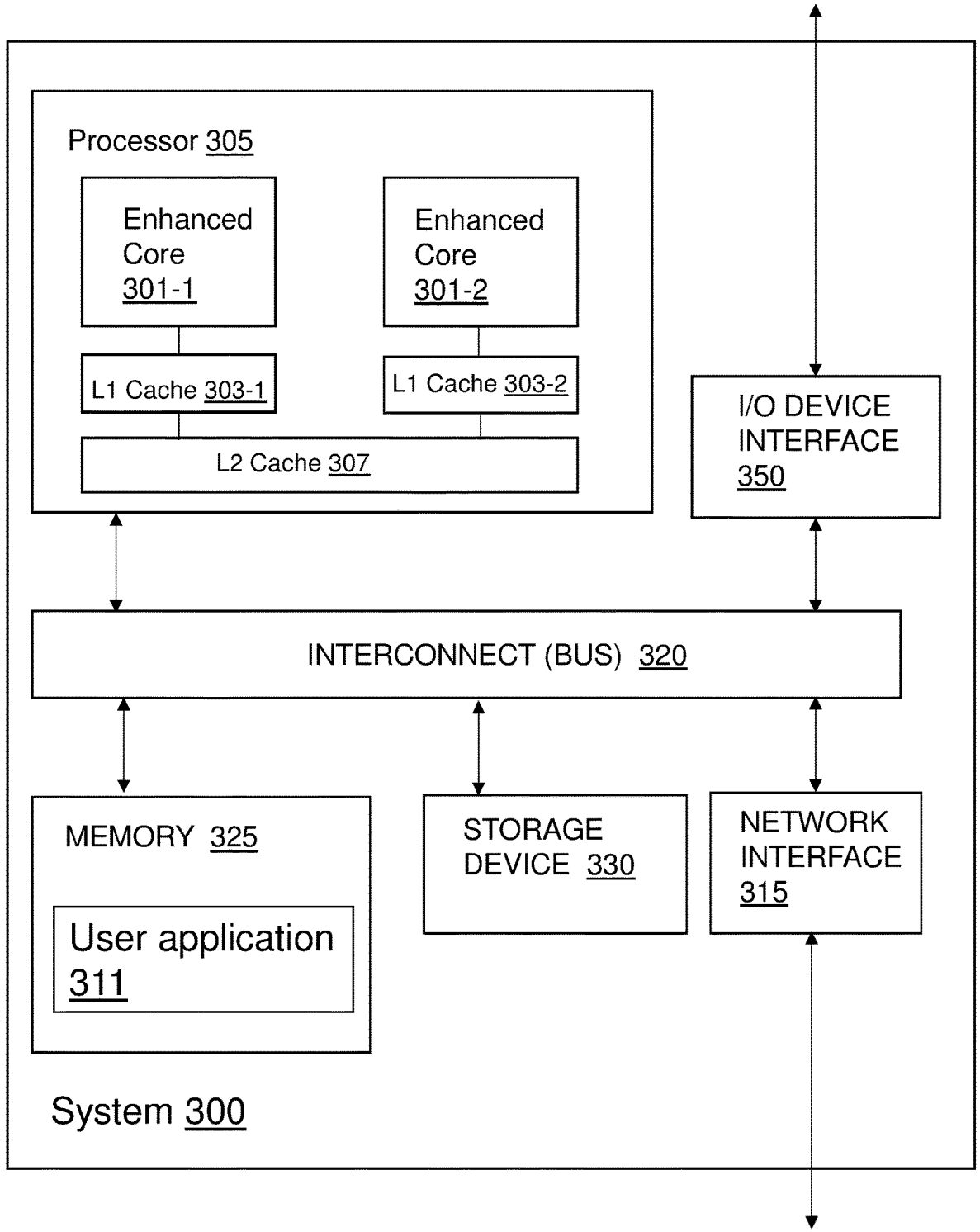
FIG. 3 is a high-level block diagram of one embodiment of an example computer system.

FIG. 3 is a high level block diagram of one embodiment of an example computer system 300. In the example shown in FIG. 3, the computer system 300 includes a memory 325, storage 330, an interconnect (e.g., BUS) 320, at least one multi-core processor 305 (also referred to as CPU 305 herein), an I/O device interface 350, and a network interface 315. It is to be understood that components depicted in computer system 300 of FIG. 3 are presented by way of example only and that, in other embodiments, other components can be included in addition to or in lieu of those shown in FIG. 3.

CPU 305 retrieves and executes programming instructions stored in the memory 325 and/or storage 330. For example, CPU 305 executes instructions from user application 311 stored in memory 325. The interconnect 320 is used to move data, such as programming instructions, between the CPU 305, I/O device interface 350, storage 330, network interface 315, and memory 325. The interconnect 320 can be implemented using one or more busses. Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN)

devices, the cloud, or other devices connected to the computer system 300 via the I/O device interface 350 or via a communication network coupled to the network interface 315.

In some embodiments, the memory 325 stores user application 311. However, in various embodiments, the user application 311 can be stored partially in memory 325 and partially in storage 330, or it can be stored entirely in memory 325, entirely in storage 330, or accessed over a network via the network interface 315.

The CPU 305 of FIG. 3 includes a first enhanced core 301-1 and a second enhanced core 301-2. Although two enhanced cores are shown in the example of FIG. 3, it is to be understood that any number of enhanced cores can be included in multi-core processor 305 in other embodiments. Additionally, although only one multi-core processor 305 is shown in the example of FIG. 3, more than one multi-core processor can be included in other embodiments. Each of the enhanced cores 301-1 and 301-2 are similar to an enhanced core described above with respect to FIGS. 1 and 2. In particular, each of the enhanced cores 301-1 and 301-2 includes a new PIDR register and corresponding PIDR circuitry. Thus, as discussed in more detail below, each of the enhanced cores 301-1 and 301-2 are configured to decode and execute the new non-privileged interrupts instructions.

In the example of FIG. 3, the multi-core processor 305 also includes a first level 1 cache 303-1, which is dedicated to the enhanced core 301-1 and a second level 1 cache 303-2, which is dedicated to the enhanced core 301-2. Additionally, the multi-core processor 305 of FIG. 3 includes a shared level 2 cache 307. However, it is to be understood that other cache configurations can be implemented in other embodiments. For example, in some embodiments, a single shared level 1 cache is used. In some embodiments, a respective dedicated level 2 cache is included for each of the enhanced cores. Additionally, in some embodiments, a level 3 cached is included. In some such embodiments, the level 3 cache is shared, and in other such embodiments, a dedicated level 3 cache is included for each enhanced core.

The user application 311 includes instructions for requesting a spin-lock, as known to one of skill in the art. In addition, the user application 311 includes the new non-privileged interrupts instructions. Thus, both the request for the spin-lock and the interrupts instruction of user application 311 are non-privileged instructions and can be executed from user space. When a thread of the user application 311 being executed needs to obtain a spin-lock for a shared resource, the thread causes the CPU 305 to execute the new non-privileged disable interrupts instruction. In particular, the thread passes an argument with the non-privileged disable interrupts instructions that represents an estimate of the amount of time the thread anticipates it will need to complete execution of the code segment for which the spin-lock is being requested. For example, in some embodiments, the estimate of time represented by the operand includes an estimate of the time needed to execute the non-privileged disable interrupts instruction, execute the instruction(s) that attempt to acquire the spin lock, execute the instruction(s) that confirm the spin lock has been acquired, execute the section of code for which the spin-lock is requested, execute the instruction(s) that release the spin lock, and execute the non-privileged enable interrupts instruction.

As the operand of the non-privileged disable interrupts instruction has a pre-determined bit size, the thread can only request to disable interrupts for no more time than can be represented by the pre-determined bit size. In other words, an upper limit is placed on the amount of time that a thread can disable interrupts. Furthermore, as discussed above, in some embodiments, the non-privileged disable interrupts instructions expects an immediate mode operand. In other words, as understood by one of skill in the art, for an immediate mode operand, the operand explicitly includes the value of the operand rather than referencing a location which contains the value, as in register addressing or direct memory addressing, for example.

Upon receipt of the non-privileged disable interrupts instruction, the CPU 305 places the non-zero operand value into a new special purpose register representing the amount of time interrupts are to be disabled (i.e. the PIDR discussed above) and initiates a count-down timer represented by periodically decrementing the value in the special purpose register. After completion of the corresponding code segment (that is, the code segment for which the spin-lock was requested) and release of the spin-lock, the thread causes the CPU 305 to execute the non-privileged enable interrupts instruction. As discussed above, in some embodiments, the non-privileged enable interrupts instruction is a separate and distinct instruction from the non-privileged disable interrupts instruction. In other embodiments, the non-privileged enable interrupts instruction is the same instruction as the non-privileged disable interrupts instruction, but with a different operand value. For example, in some embodiments, the non-privileged enable interrupts instruction includes an operand value of zero representing that interrupts are to be enabled. The non-privileged enable interrupts instruction causes the CPU 305 to cancel the count-down timer represented by decrementing the special purpose register and enable interrupts. Additionally, in some embodiments, the CPU places the zero value into the special purpose register (i.e. PIDR).

In the event that the count-down timer is decremented to zero, a programming error is detected. For example, the programmer may have forgot to cancel the count-down timer, or the programmer may have underestimated the amount of time required to complete the corresponding code segment. Thus, when the count-down timer is decremented to zero, the CPU 305 enables interrupts. In addition, in some embodiments, in response to decrementing the value in the PIDR, the CPU 305 raises an exception similar to a memory access exception, for example. The exception can be communicated for debugging purposes, such as an error message displayed on a display screen or monitor communicatively coupled to the computer system 300 via the I/O device interface 350. The countdown-timer, therefore, prevents misbehavior of one thread or task from compromising other threads or tasks by placing an upper limit on the amount of time interrupts can be disabled even in the event that the application misbehaves or does not properly enable interrupts after completion of the corresponding code segment.

Furthermore, by enabling a non-privileged instruction to disable and enable interrupts, the embodiments described herein enable use of non-privileged instructions to obtain a spin-lock. In particular, since interrupts are disabled, the thread holding the spin-lock cannot be interrupted. As such, the potential problems with using spin-locks in user space discussed above, such as unbounded priority inversion, are addressed by enabling a non-privileged bounded disabling of interrupts. Therefore, the embodiments described herein enable the performance benefits of spin-locks without the risks associated with granting privileged access to the kernel space to user or third party applications.

Figure 4:
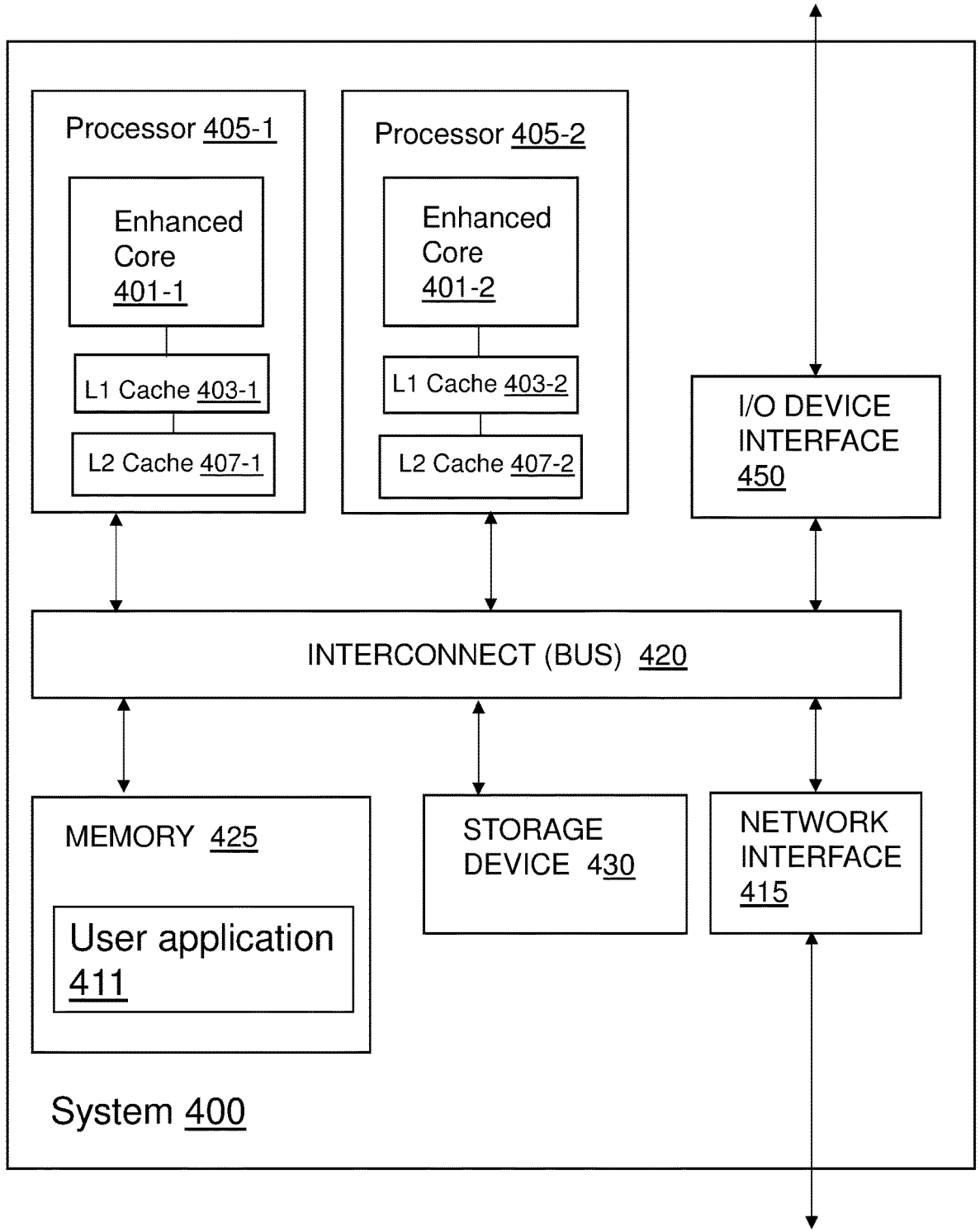
FIG. 4 is a high-level block diagram of another embodiment of an example computer system.

FIG. 4 is a high level block diagram of one embodiment of another example computer system 400. The components of computer system 400 are similar to and function similarly to corresponding components of computer system 300. For example, I/O device interface 450, Interconnect 420, memory 425, storage device 430, network interface 415, and user application 411 function similarly to I/O device interface 350, Interconnect 320, memory 325, storage device 330, network interface 315, and user application 311 discussed above.

However, in lieu of a multi-core processor, as in computer system 300, the computer system 400 includes multiple single core processors 405-1 and 405-2. Although only two single core processors 405-1 and 405-2 are shown in the example of FIG. 4, it is to be understood that more than two single core processors can be included in other embodiments of a multi-processor computer system. Each of the single core processors 405-1 and 405-2 includes a respective enhanced core 401-1 and 401-2, a respective dedicated level 1 cache 403-1 and 403-2, and a respective dedicated level 2 cache 407-1 and 407-2. As with the computer system 300, it is to be understood that other cache configurations can be used in other embodiments.

Each of the enhanced cores 401-1 and 401-2 are configured similar to one of the enhanced cores discussed above, such as enhanced core 101 and enhanced core 201. That is, each of the enhanced cores 401-1 and 401-2 are configured to include a new special purpose register, such as PIDR 168, for determining how long to disable interrupts and circuitry, such as PIDR circuitry 172, for decrementing the special purpose register to act as a countdown-timer, as discussed above. Additionally, as discussed above, each of the enhanced cores 401-1 and 401-2 are configured to execute a new non-privileged instruction to disable interrupts. Thus, the example computer system 400 is representative of another form of parallel computing in which the embodiments described herein can be implemented.

Figure 5:
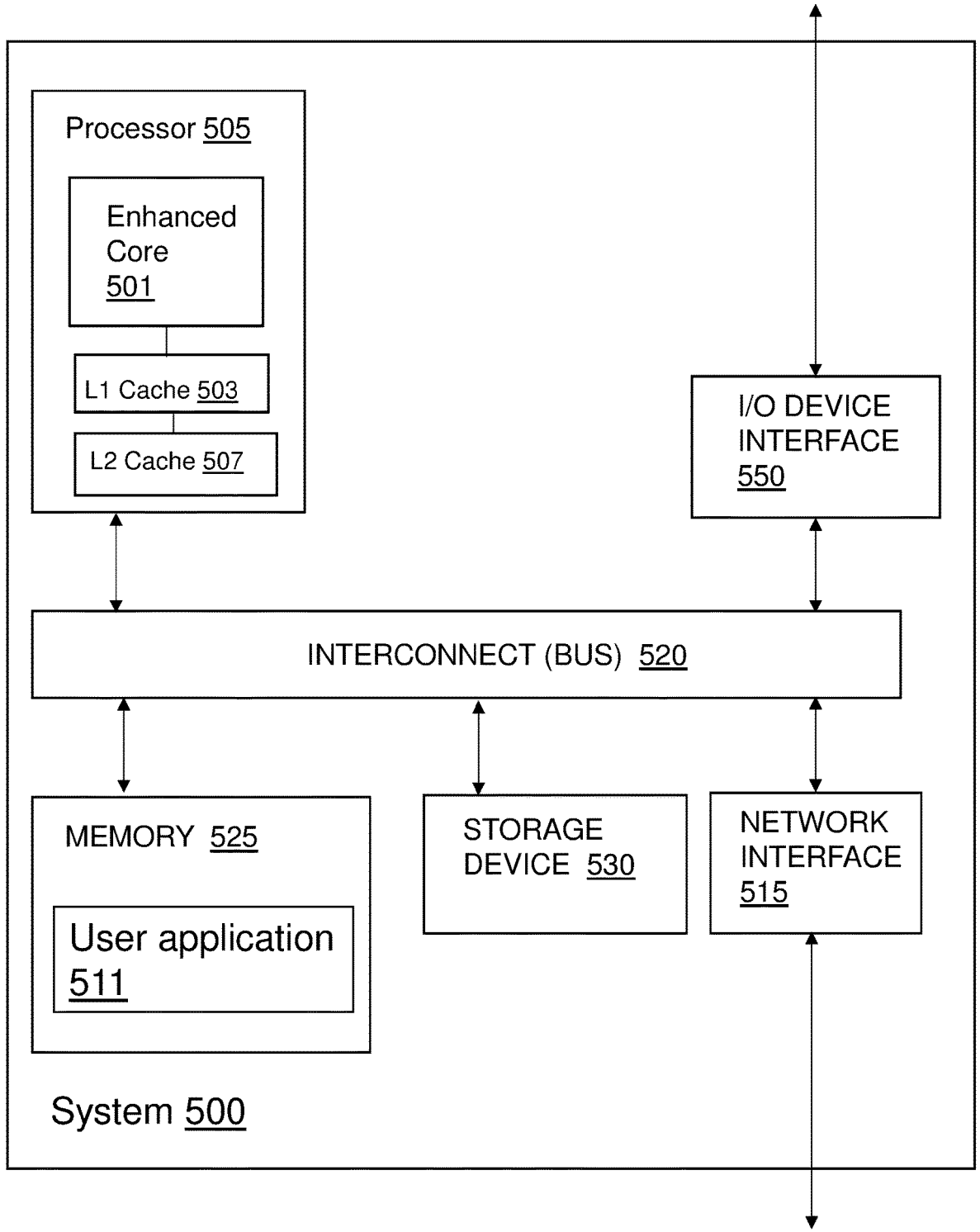
FIG. 5 is a high-level block diagram of another embodiment of an example computer system.

Similarly, FIG. 5 is a high level block diagram of one embodiment of another example computer system 500. Computer system 500 is representative of another computing environment in which embodiments described herein can be implemented. The components of computer system 500 are similar to the corresponding components of computer system 300 and computer system 400 discussed above. For example, I/O device interface 550, Interconnect 520, memory 525, storage device 530, network interface 515, and user application 511 function similarly to I/O device interface 350, Interconnect 320, memory 325, storage device 330, network interface 315, and user application 311 discussed above.

However, the computer system 500 includes one single core processor 505. The processor 505 includes an enhanced core 501, a dedicated level 1 cache 503, and a dedicated level 2 cache 407. As with the computer systems 300 and 400, it is to be understood that other cache configurations can be used in other embodiments.

The enhanced core 501 is configured similar to one of the enhanced cores discussed above, such as enhanced core 101 and enhanced core 201. That is, the enhanced core 501 is configured to include a new special purpose register, such as PIDR 168, for determining how long to disable interrupts and circuitry, such as PIDR circuitry 172, for decrementing the special purpose register to act as a countdown-timer, as discussed above. Additionally, as discussed above, the enhanced core 501 is configured to execute a new non-privileged instruction to disable interrupts. Additionally, in some embodiments, the processor 505 is configured to implement simultaneous multithreading (SMT) such that the enhanced core 501 appears as two or more cores to the operating system.

In some embodiments implementing SMT, there are a plurality of copies of the PIDR. For example, in a core that has N-way SMT, there are N copies of the PIDR, where N is an integer representing the number of cores which appear to the operating system. In each clock cycle, only one of the N SMT threads is able to execute. Thus, the PIDR corresponding to the executing SMT thread is decremented, whereas the other copies of the PIDR corresponding to other SMT threads are unaffected during that clock cycle.

Additionally, hardware in the SMT core 501 determines which of the N SMT threads is allowed to progress during each clock cycle. For example, in situations where some of the SMT threads are stalled, such as due to load or store delays, the SMT core 501 automatically arranges to allow one of the other SMT threads to execute. Additionally, in some embodiments, when multiple SMT threads are ready to execute their next instruction, a scheduler in the SMT core 501 is configured to give priority to SMT threads that currently have a non-zero PIDR value. Giving priority to SMT threads that currently have a non-zero value in the corresponding copy of the PIDR reduces the likelihood that other threads will encounter contention when attempting to acquire spin-locks. This is because the SMT threads having a non-zero value likely already hold a spin-lock and will be able to complete execution and release the spin-lock which reduces the likelihood of other threads attempting to obtain a spin-lock will encounter contention.

Figure 6:
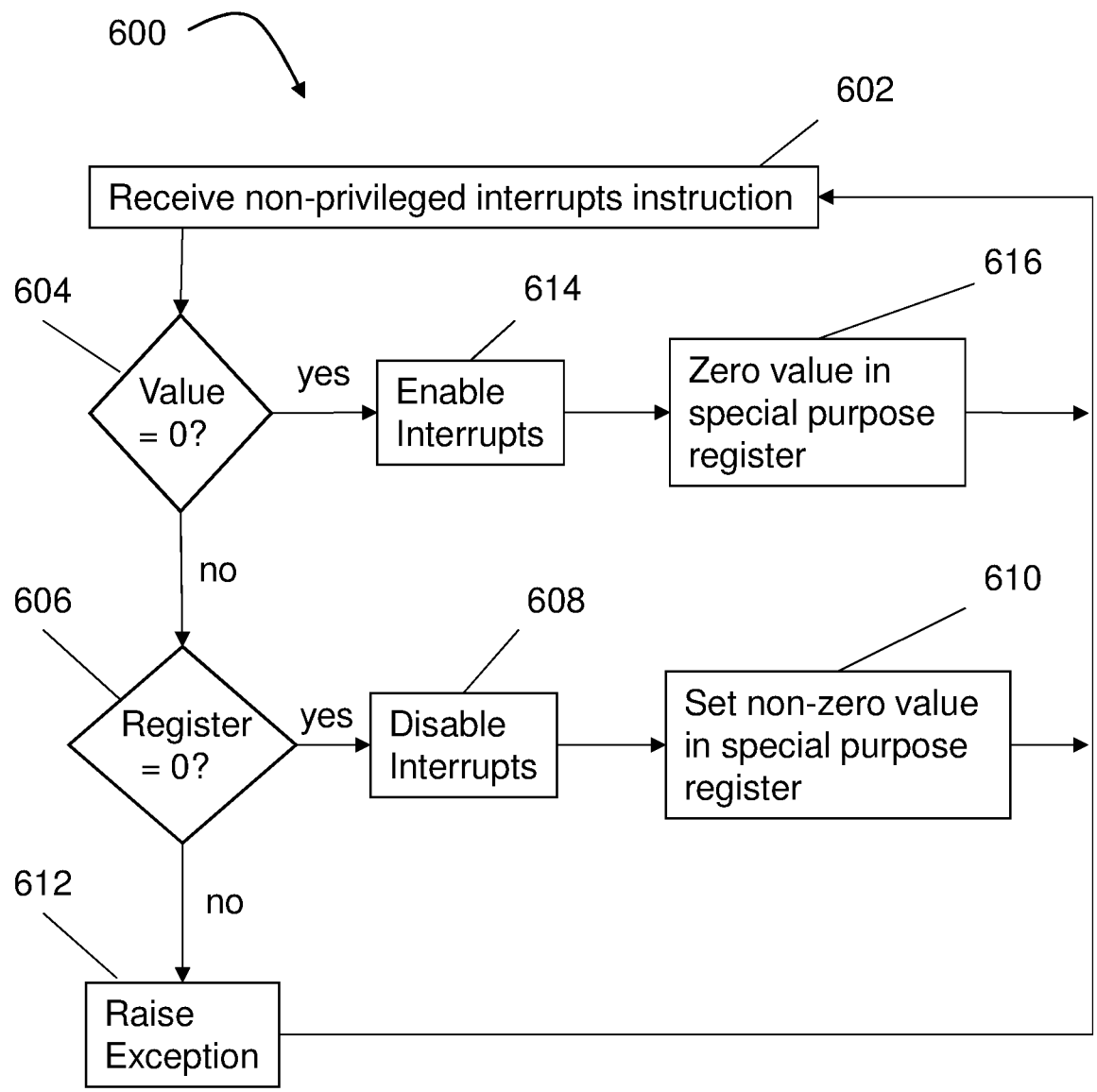
FIG. 6 is a flow diagram of one embodiment of an example method for implementing non-privileged interrupts instructions.

FIG. 6 is a flow diagram of one embodiment of an example method 600 for implementing non-privileged interrupts instructions. In particular, the method 600 is an example method for implementing non-privileged interrupts instructions using a single non-privileged interrupts instructions for both the non-privileged disable interrupts instruction and the non-privileged enable interrupts instruction. The method 600 can be implemented by an enhanced core, such as enhanced core 101 or enhanced core 201 discussed above. It is to be understood that the order of actions in example method 600 is provided for purposes of explanation and that the method 600 can be performed in a different order in other embodiments. Similarly, it is to be understood that some actions can be omitted, or additional actions can be included in other embodiments.

At block 602, a non-privileged interrupts instruction is received. The non-privileged interrupts instruction in the example of FIG. 6 includes an operand value. As discussed above, in some embodiments, the non-privileged interrupts instruction includes an immediate mode operand of a predetermined bit size. At block 604, the enhanced core determines if the operand value is zero and, thus, the received non-privileged interrupts instruction is a non-privileged enable interrupts instruction. If the operand value is non-zero, then the received non-privileged interrupts instruction is a non-privileged disable interrupts instruction.

If the operand value is non-zero, the enhanced core determines, at block 606, if a special purpose register associated with disabling interrupts, such as the PIDR discussed above, has a value of zero. If the special purpose register associated with disabling interrupts has a zero value, then the enhanced core disables interrupts, at block 608, using techniques known to one of skill in that art. The enhanced core also places the non-zero value from the operand of the non-privileged disable interrupts instruction into the special purpose register associated with disabling interrupts at block 610. In particular, the non-zero value indicates the approximate amount of time for which to disable interrupts. Setting the special purpose register with a non-zero value can trigger countdown circuitry, such as PIDR circuitry discussed above, to begin a process of counting down to zero by periodically decrementing the value in the special purpose register associated with disabling interrupts. One example method of counting down is described in more detail below with respect to FIG. 8. Method 600 then returns to block 602 to await a new non-privileged interrupts instruction.

In some embodiments, if the value of the special purpose register associated with disabling interrupts is determined to be a non-zero value at block 606, then an exception is raised at block 612. In particular, the raised exception is an invalid operation exception to prevent application code from holding interrupts disabled for arbitrarily long durations of time. In other words, in such embodiments, the application code cannot reset a non-zero value of the special purpose to another non-zero value as this would enable application code to prevent the countdown timer from reaching zero. In some embodiments, when the exception is raised, the exception is communicated to a user via a display screen or monitor communicatively coupled to the enhanced core. Additionally, in some embodiments, raising the exception at block 612 includes resetting the special purpose register to zero in response to the raised exception. In other embodiments, the enhanced core does not adjust the value of the special purpose register associated with disabling interrupts as part of raising the exception. In other words, in such embodiments, the enhanced core is configured to ignore the non-zero value of the received non-privileged disable interrupts instruction when the special purpose register has a non-zero value. The method 600 then returns to block 602 to await a new non-privileged interrupts instruction.

If the operand of the received non-privileged interrupts instruction has a zero value at block 604, then the enhanced core enables interrupts at block 614, using techniques known to one of skill in the art, and places the zero value in the special purpose register associated with disabling interrupts, at block 616. In some embodiments, placing a zero value in the special purpose register associated with disabling interrupts cancels a running countdown timer. Thus, application code can enable interrupts once the code segment has completed by executing a new non-privileged interrupts instruction with a zero operand value. After placing the zero value in the special purpose register associated with disabling interrupts, at block 616, method 600 returns to block 602 to await a new non-privileged interrupts instruction. As described in more detail below with respect to FIG. 8, if the countdown timer reaches zero prior to receiving a non-privileged enable interrupts instruction, then interrupts are enabled as a result of the countdown timer reaching zero.

Figure 7:
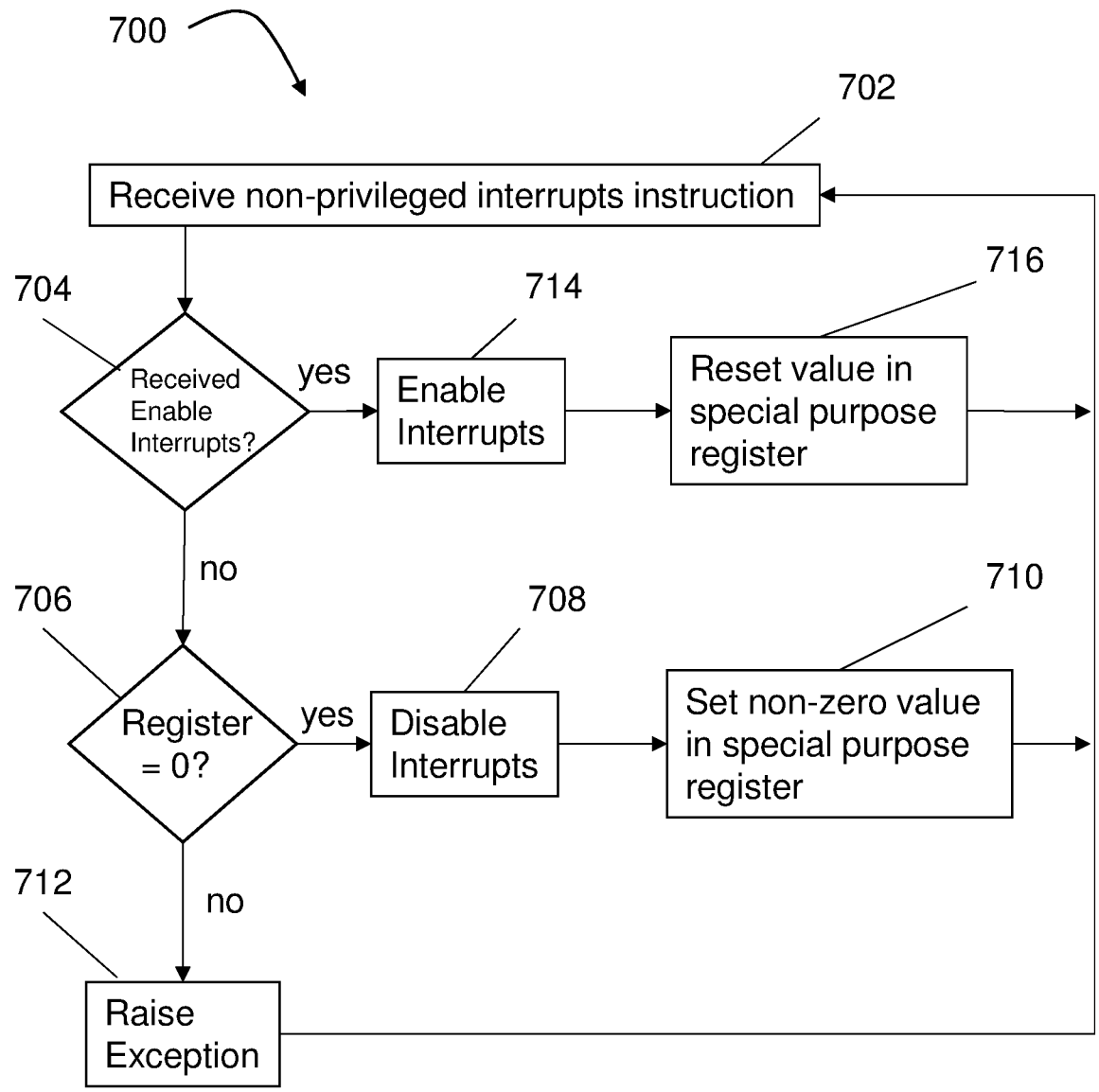
FIG. 7 is a flow diagram of one embodiment of another example method for implementing non-privileged interrupts instructions.

FIG. 7 is a flow diagram of one embodiment of another method 700 of implementing non-privileged interrupts instructions. In particular, the method 700 is an example method for implementing non-privileged interrupts instructions using two separate non-privileged interrupts instructions for the non-privileged disable interrupts instruction and the non-privileged enable interrupts instruction. The method 700 can be implemented by an enhanced core, such as enhanced core 101 or enhanced core 201 discussed above. It is to be understood that the order of actions in example method 700 is provided for purposes of explanation and that the method 700 can be performed in a different order in other embodiments. Similarly, it is to be understood that some actions can be omitted, or additional actions can be included in other embodiments.

At block 702, a non-privileged interrupts instruction is received. At block 704, it is determined if the received non-privileged interrupts instruction is a non-privileged enable interrupts instruction or a non-privileged disable interrupts instruction. If it is determined that the received non-privileged interrupts instruction is a non-privileged disable interrupts instruction, the method 700 proceeds to block 706. The non-privileged disable interrupts instructions include an operand value indicating an approximate amount of time for which to disable interrupts. As discussed above, in some embodiments, the non-privileged disable interrupts instruction includes an immediate mode operand of a predetermined bit size. At 706, the enhanced core determines if a special purpose register associated with disabling interrupts, such as the PIDR discussed above, has a value of zero.

In some embodiments, if the value of the special purpose register associated with disabling interrupts is determined to be a non-zero value at block 706, then an exception is raised at block 712. In particular, the raised exception is an invalid operation exception to prevent application code from holding interrupts disabled for arbitrarily long durations of time. In other words, in such embodiments, the application code cannot reset a non-zero value of the special purpose to another non-zero value as this would enable application code to prevent the countdown timer from reaching zero. In some embodiments, when the exception is raised, the exception is communicated to a user via a display screen or monitor communicatively coupled to the enhanced core. Additionally, in some embodiments, raising the exception at block 712 includes resetting the special purpose register to zero in response to the raised exception. In other embodiments, the enhanced core does not adjust the value of the special purpose register associated with disabling interrupts as part of raising the exception. In other words, in such embodiments, the enhanced core is configured to ignore the non-zero value of the received non-privileged disable interrupts instruction when the special purpose register has a non-zero value. After raising the exception at block 712, the method 700 returns to block 702 to await a new non-privileged interrupts instruction.

If the special purpose register associated with disabling interrupts has a zero value, at block 706, then the enhanced core disables interrupts, at block 708, using techniques known to one of skill in that art. The enhanced core also places the non-zero value from the operand of the non-privileged disable interrupts instruction into the special purpose register associated with disabling interrupts at block 710. In particular, the non-zero value indicates the approximate amount of time for which to disable interrupts. Setting the special purpose register with a non-zero value can trigger countdown circuitry, such as PIDR circuitry discussed above, to begin a process of counting down to zero by periodically decrementing the value in the special purpose register associated with disabling interrupts. One example method of counting down is described in more detail below with respect to FIG. 8. Method 700 then returns to block 702 to await a new non-privileged interrupts instruction.

If it is determined at block 704 that the received non-privileged interrupts instructions is a non-privileged enable interrupts instruction, the method 700 proceeds to block 714. At block 714, interrupts are enabled using techniques known to one of skill in the art. At block 716, the special purpose register associated with disabling interrupts is reset. In some embodiments, resetting the special purpose register associated with disabling interrupts cancels a running countdown timer. Thus, application code can enable interrupts once the code segment has completed by executing a non-privileged enable interrupts instruction. In some embodiments, the special purpose register associated with disabling interrupts is reset by placing a zero value in the register. In some embodiments, the non-privileged enable interrupts instruction does not have a zero operand value, but the non-privileged enable interrupts instruction causes the enhanced core to place a zero value in the special purpose register associated with disabling interrupts in order to reset the special purpose register associated with disabling interrupts. The method 700 then returns to block 702 to await a new non-privileged interrupts instruction. As described in more detail below with respect to FIG. 8, if the countdown timer reaches zero prior to receiving a non-privileged enable interrupts instruction, then interrupts are enabled as a result of the countdown timer reaching zero.

Figure 8:
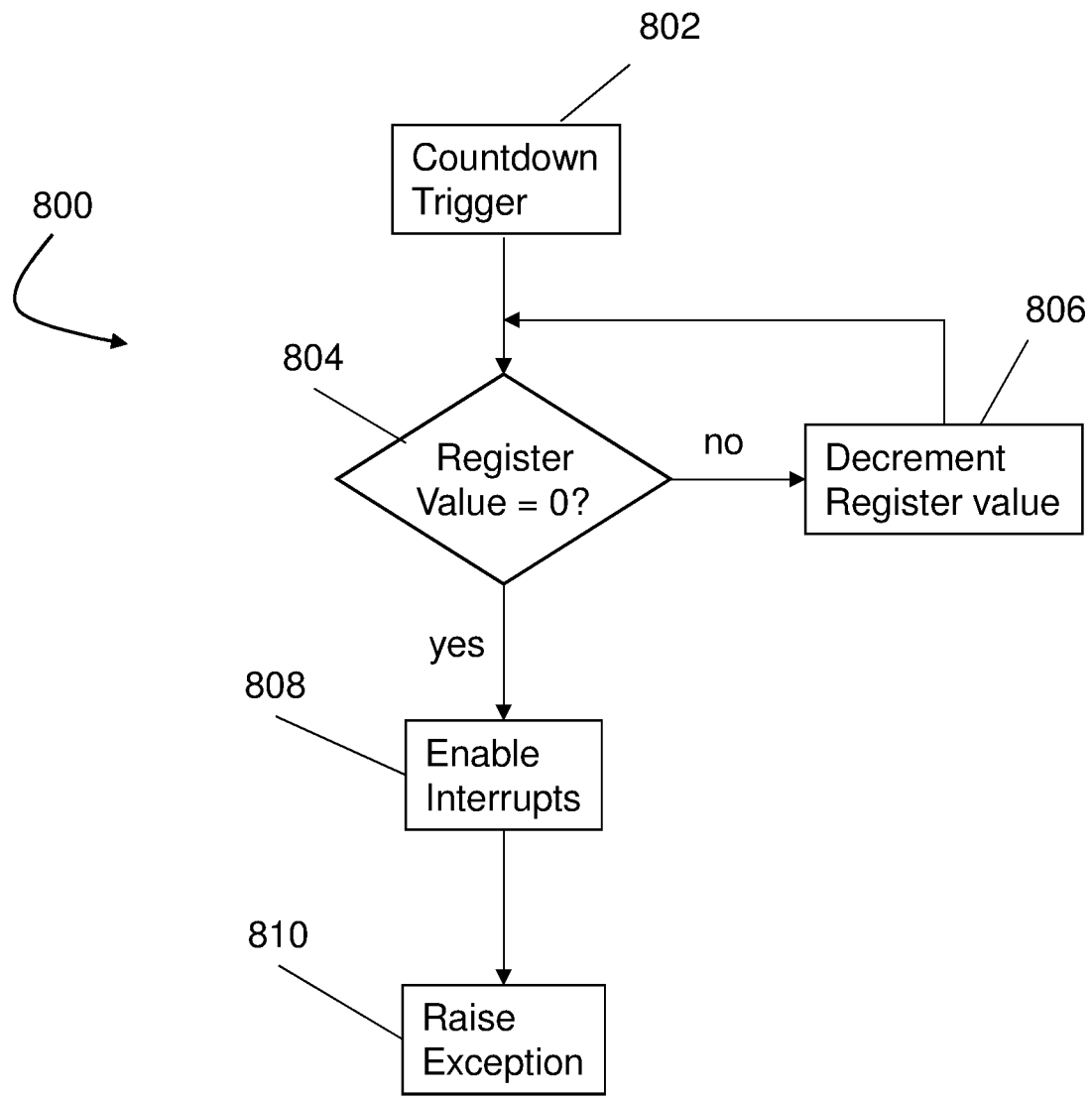
FIG. 8 is a flow diagram of one embodiment of an example method of implementing a countdown timer for disabling interrupts.

FIG. 8 is a flow diagram of one embodiment of a method 800 of counting down the time for disabling interrupts. Method 800 can be implemented by circuitry in an enhanced core, such as PIDR circuitry 172 or PIDR circuitry 272 of enhanced core 101 and enhanced core 201 discussed above. It is to be understood that the order of actions in example method 800 is provided for purposes of explanation and that the method can be performed in a different order in other embodiments. Similarly, it is to be understood that some actions can be omitted, or additional actions can be included in other embodiments.

At block 802, the circuitry of the enhanced core is triggered to begin a countdown. For example, in some embodiments, placing a non-zero value in a special purpose register associated with disabling interrupts, such as the PIDR discussed above, triggers a countdown. At block 804, the circuitry of the enhanced core determines if the value of the special purpose register associated with disabling interrupts is zero. If the value is not zero at block 804, the circuitry decrements the value stored in the special purpose register associated with disabling interrupts at block 806. Method 800 then returns to block 804 to check during the next clock cycle if the value of the special purpose register associated with disabling interrupts is zero. Thus, blocks 804 and 806 are performed based on each clock cycle to decrement the value stored in the special purpose register associated with disabling interrupts. In some embodiments, the frequency of decrementing the value in the special purpose register associated with disabling interrupts is scaled to the clock rate of a clock in the enhanced core, as discussed above.

If the value in the special purpose register associated with disabling interrupts is determined to be zero at block 804, the circuitry in the enhanced core enables interrupts at block 808. At block 810, the circuitry in the enhanced core cause an exception to be raised and communicated to a user, as discussed above. Thus, method 800 enables an upper limit on the amount of time that a user or third party application can disable interrupts even if the application has an error or misbehaves, as discussed above.

Figure 9:
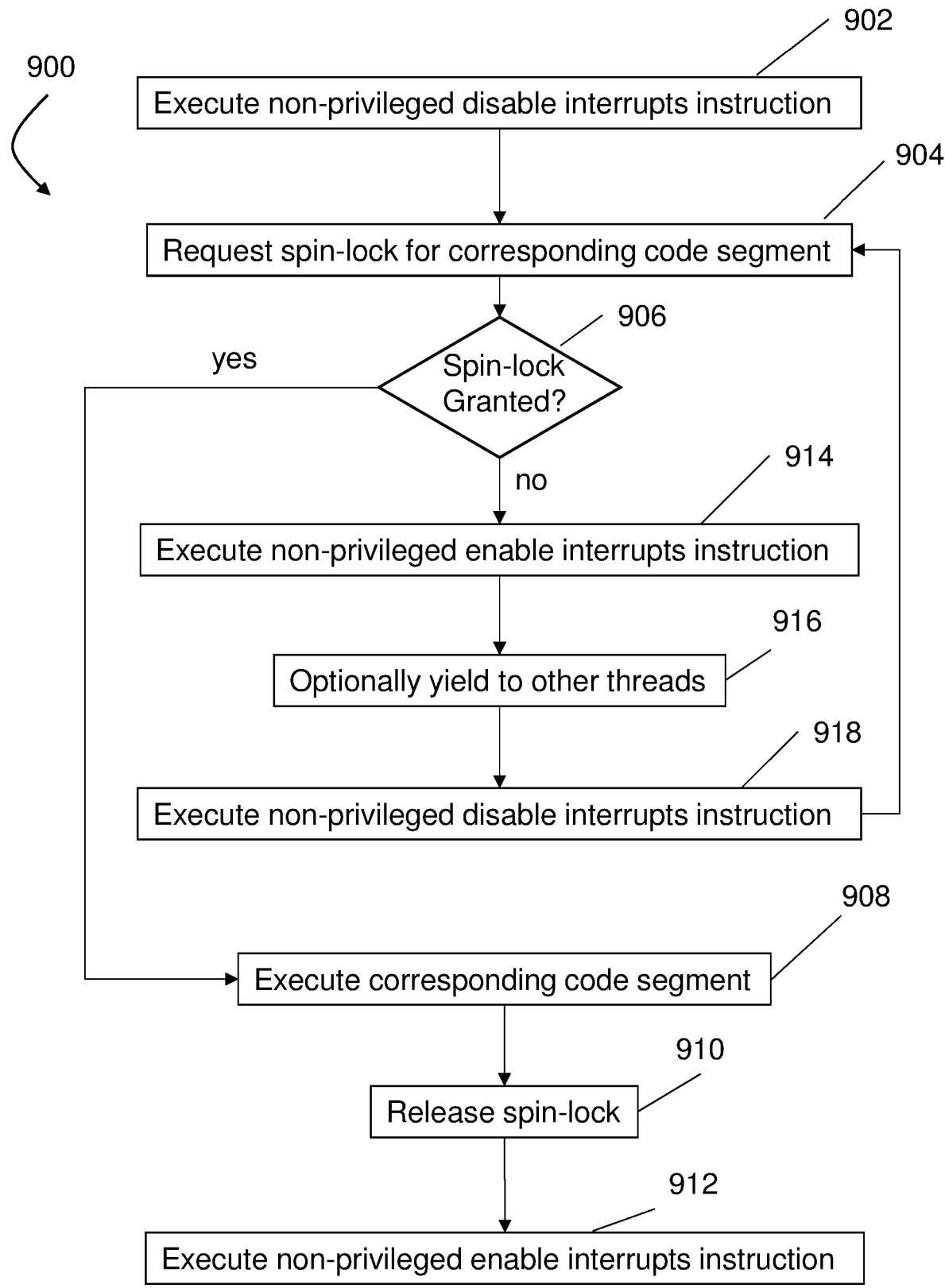
FIG. 9 is a flow diagram of one embodiment of an example method of implementing a spin-lock by an application executing in user space.

FIG. 9 is a flow diagram of one embodiment of a method 900 of implementing a spin-lock by an application executing in user space. Method 900 can be implemented by a processor executing instructions, such as CPU 305 executing user application 311. It is to be understood that the order of actions in example method 900 is provided for purposes of explanation and that the method can be performed in a different order in other embodiments. Similarly, it is to be understood that some actions can be omitted, or additional actions can be included in other embodiments.

At block 902, a non-privileged disable interrupts instruction is executed. As discussed above, in some embodiments, the non-privileged disable interrupts instruction is distinguished from a non-privileged enable interrupts instruction by having a non-zero value. That is, in some embodiments, a non-privileged enable interrupts instruction is the same as a non-privileged disable interrupts instruction, but with a different operand value, as discussed above. In other embodiments, the non-privileged disable interrupts instruction and the non-privileged enable interrupts instructions are distinct and separate instructions. In both scenarios, the non-privileged disable interrupts instruction includes a non-zero operand value. The non-zero operand value represents an estimated amount of time to execute the corresponding code segment, as discussed above. Examples of executing the non-privileged disable interrupts instruction are discussed above with respect to FIG. 6 and FIG. 7. At block 904, non-privileged instructions for requesting a spin-lock are executed for a corresponding code segment. At block 906, it is determined if the request for the spin-lock is granted.

In response to determining, at block 906, that the spin-lock request is granted, the corresponding code segment is executed at block 908. At block 910, in response to completing execution of the corresponding code segment, non-privileged instructions for releasing the spin-lock are executed. At block 912, a non-privileged enable interrupts instruction is executed. As discussed above, in some embodiments, the non-privileged enable interrupts instruction is distinguished from a non-privileged disable interrupts instruction by having an operand value of zero. Examples of executing the non-privileged enable interrupts instruction are discussed above with respect to FIG. 6 and FIG. 7. For example, in some embodiments, the non-privileged enable interrupts instruction has a zero value operand used to indicate that execution of the corresponding code segment is complete and that interrupts are to be enabled. In other embodiments, a non-privileged enable interrupts instruction distinct and separate from the non-privileged disable interrupts instruction is executed to indicate that execution of the corresponding code segment is complete and that interrupts are to be enabled. The separate and distinct non-privileged enable interrupts instruction need not have an operand with a specific value, in some embodiments. Thus, by enabling a user application executing in user space to temporarily disable interrupts, the user application is also able to obtain a spin-lock while avoiding the potential problems discussed above with respect to using spin-locks in user space.

If it is determined at block 906 that the request for the spin-lock is not granted, then a non-privileged enable interrupts instruction is executed at block 914, similar to the non-privileged enable interrupts instruction discussed above with respect to block 912. Examples of executing non-privileged enable interrupts instructions are also discussed above with respect to FIG. 6 and FIG. 7. At block 916, the thread which requested the spin-lock optionally yields to other threads to enable other threads to execute. At block 918, another non-privileged disable interrupts instruction is executed similar to the non-privileged disable interrupts instruction discussed above with respect to block 902 and method 900 returns to block 904 to execute non-privileged instructions to request a spin-lock. Thus, method 900 disables interrupts prior to obtaining a spin-lock and releases the spin-lock prior to enabling interrupts in order to prevent race conditions where a thread is preempted after obtaining a spin-lock but prior to releasing the spin-lock. Additionally, method 900 accounts for contention with other threads and enables interrupts if the spin-lock is not obtained.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a method that comprises receiving a non-privileged disable interrupts instruction from a user application executing in user space, the non-privileged disable interrupts instruction having an operand with a non-zero value; determining a value in a special purpose register associated with disabling interrupts; and in response to determining that the value in the special purpose register associated with disabling interrupts is zero, disabling interrupts and placing the non-zero value of the operand in the special purpose register associated with disabling interrupts.

Example 2 include the method of example 1 and further comprises receiving a non-privileged enable interrupts instruction from the user application executing in user space after disabling interrupts; and in response to receiving the non-privileged enable interrupts instruction, enabling interrupts and resetting the special purpose register associated with disabling interrupts.

Example 3 includes the method of any of examples 1 and 2, and further comprises, in response to determining that the value in the special purpose register associated with disabling interrupts is a non-zero value, raising an exception.

Example 4 includes the method of any of examples 1-3, and further comprises, in response to placing the non-zero value of the operand in the special purpose register associated with disabling interrupts, executing a countdown timer. Executing the countdown timer comprises, for each clock cycle: determining the value in the special purpose register associated with disabling interrupts; in response to determining that the value in the special purpose register associated with disabling interrupts is non-zero, decrementing the value in the special purpose register associated with disabling interrupts; and in response to determining that the value in the special purpose register associated with disabling interrupts is zero, enabling interrupts.

Example 5 includes the method of example 4, wherein executing the countdown timer further comprises, in response to determining that the value in the special purpose register associated with disabling interrupts is zero, communicating a raised exception to a user.

Example 6 includes the method of any of examples 1-5, wherein the value of the operand is an immediate mode operand having a predetermined bit size.

Example 7 includes a method that comprises executing a non-privileged disable interrupts instruction in user space to disable interrupts, wherein the non-privileged disable interrupts instruction has a non-zero operand value; after executing the non-privileged disable interrupts instruction, executing a non-privileged spin-lock request in user space for a corresponding code segment; and in response to obtaining the spin-lock, executing the corresponding code segment. The method further comprises, in response to completing execution of the corresponding code segment, releasing the spin-lock; and after releasing the spin-lock, executing a non-privileged enable interrupts instruction in user space to enable interrupts.

Example 8 includes the method of example 7, wherein executing the non-privileged disable interrupts instruction comprises disabling interrupts based on the non-zero operand value in the non-privileged disable interrupts instruction; placing the non-zero operand value in a special purpose register associated with disabling interrupts; and executing a countdown timer.

Example 9 includes the method of example 8, wherein executing the non-privileged enable interrupts instruction comprises enabling interrupts based on a zero operand value in the non-privileged enable interrupts instruction; placing the zero operand value in the special purpose register associated with disabling interrupts; and cancelling the countdown timer.

Example 10 includes the method of any of examples 8-9, wherein executing the countdown timer comprises, for each clock cycle determining the value in the special purpose register associated with disabling interrupts; in response to determining that the value in the special purpose register associated with disabling interrupts is non-zero, decrementing the value in the special purpose register associated with disabling interrupts; and in response to determining that the value in the special purpose register associated with disabling interrupts is zero, enabling interrupts.

Example 11 includes the method of example 10, wherein executing the countdown timer further comprises in response to determining that the value in the special purpose register associated with disabling interrupts is zero, communicating a raised exception to a user.

Example 12 includes the method of any of examples 7-11, wherein the non-privileged disable interrupts instruction expects an immediate mode operand having a predetermined bit size.

Example 13 includes a processor core. The processor core comprises a control unit configured to receive and decode a non-privileged disable interrupts instruction having an operand value which represents an estimate of an amount of time to disable interrupts; and a plurality of registers, wherein one of the plurality of registers is a first special purpose register associated with the non-privileged disable interrupts instruction for storing the operand value from the non-privileged disable interrupts instruction.

Example 14 includes the processor core of example 13, and further comprises circuitry associated with the first special purpose register and configured to periodically decrement the operand value stored in the first special purpose register.

Example 15 includes the processor core of example 14, wherein the circuitry associated with the first special purpose register is further configured to enable interrupts and raise an exception in response to determining that the operand value stored in the first special purpose register associated with the non-privileged disable interrupts instruction has been decremented to zero.

Example 16 includes the processer core of any of examples 14-15, wherein the circuitry associated with the first special purpose register is configured to periodically decrement the operand value at a frequency scaled proportionally to a clock rate of a clock in the processor core.

Example 17 includes the processor core of example 16, and further comprises a second special purpose register configured to store a value representative of an estimate of a number of central processing unit (CPU) time cycles consumed by a running thread; and an oscillator associated with the second special purpose register and configured to trigger increments in the value stored in the second special purpose register at a frequency which is proportional to the clock rate of the clock. The circuitry associated with the first special purpose register is configured to decrement the value stored in the first special purpose register in lock-step with each increment of the second special purpose register.

Example 18 includes a computer system. The computer system comprises a memory configured to store a user application and one or more processors communicatively coupled to the memory and configured to execute the user application in user space. Each of the one or more processors has one or more cores. Each of the one or more cores comprises a control unit configured to receive and decode a respective non-privileged disable interrupts instruction of the user application, the respective non-privileged disable interrupts instruction having a respective operand value which represents a respective estimate of an amount of time to disable interrupts; and a plurality of registers, wherein one of the plurality of registers is a first special purpose register configured to store the operand value from the respective non-privileged disable interrupts instruction.

Example 19 includes the computer system of example 18, wherein each of the one or more processors is configured to determine the respective operand value in the respective non-privileged disable interrupts instruction; in response to determining that the respective operand value is a non-zero value, determine a value in the first special purpose register; and in response to determining that the value in the first special purpose register is zero, disable interrupts and place the non-zero operand value in the first special purpose register.

Example 20 includes the computer system of example 19, wherein each of the one or more processors is further configured to enable interrupts and place a zero value in the first special purpose register in response to receiving a respective non-privileged enable interrupts instruction.

Example 21 includes the computer system of any of examples 18-20, wherein each of the one or more cores further comprises circuitry associated with the first special purpose register. For each clock cycle, the circuitry associated with the first special purpose register is configured to determine the value in the first special purpose register; in response to determining that the value in the first special purpose register is non-zero, decrement the value in the first special purpose register; and in response to determining that the value in the first special purpose register is zero, enable interrupts.

Example 22 includes a computer program product. The computer program product comprises a computer readable storage medium having a computer readable program stored therein, wherein the computer readable program, when executed by a processor, causes the processor to execute a non-privileged disable interrupts instruction in user space to disable interrupts, wherein the non-privileged disable interrupts instruction has a non-zero operand value; execute a non-privileged spin-lock request in user space for a corresponding code segment after executing the non-privileged disable interrupts instruction; in response to obtaining the spin-lock, execute the corresponding code segment; in response to completing execution of the corresponding code segment, release the spin-lock; and after releasing the spin-lock, execute a non-privileged enable interrupts instruction in user space to enable interrupts.

Example 23 includes the computer program product of example 22, wherein the computer readable program is further configured to cause the processor to execute the non-privileged disable interrupts instruction by disabling interrupts based on the non-zero operand value in the first non-privileged disable interrupts instruction; placing the non-zero operand value in a special purpose register associated with disabling interrupts; and executing a countdown timer.

Example 24 includes the computer program product of example 23, wherein the computer readable program is further configured to cause the processor to execute the non-privileged enable interrupts instruction by enabling interrupts; resetting the special purpose register associated with disabling interrupts; and cancelling the countdown timer.

Example 25 includes the computer program product of any of examples 23-24, wherein the computer readable program is further configured to cause the processor to execute the countdown timer by, for each clock cycle, determining the value in the special purpose register associated with disabling interrupts; in response to determining that the value in the special purpose register associated with disabling interrupts is non-zero, decrementing the value in the special purpose register associated with disabling interrupts; and in response to determining that the value in the special purpose register associated with disabling interrupts is zero, enabling interrupts Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
receiving a non-privileged disable interrupts instruction from a user application executing in user space, the non-privileged disable interrupts instruction having an operand with a non-zero value;
determining a value in a special purpose register associated with disabling interrupts; and
in response to determining that the value in the special purpose register associated with disabling interrupts is zero, disabling interrupts and placing the non-zero value of the operand in the special purpose register associated with disabling interrupts.

2. The method of claim 1, further comprising:
receiving a non-privileged enable interrupts instruction from the user application executing in user space after disabling interrupts; and
in response to receiving the non-privileged enable interrupts instruction, enabling interrupts and resetting the special purpose register associated with disabling interrupts.

3. The method of claim 1, further comprising:
in response to determining that the value in the special purpose register associated with disabling interrupts is a non-zero value, raising an exception.

4. The method of claim 1, further comprising:
in response to placing the non-zero value of the operand in the special purpose register associated with disabling interrupts, executing a countdown timer, wherein executing the countdown timer comprises, for each clock cycle:
determining the value in the special purpose register associated with disabling interrupts;
in response to determining that the value in the special purpose register associated with disabling interrupts is non-zero, decrementing the value in the special purpose register associated with disabling interrupts; and
in response to determining that the value in the special purpose register associated with disabling interrupts is zero, enabling interrupts.

5. The method of claim 4, wherein executing the countdown timer further comprises:
in response to determining that the value in the special purpose register associated with disabling interrupts is zero, communicating a raised exception to a user.

6. The method of claim 1, wherein the value of the operand is an immediate mode operand having a predetermined bit size.

7. A method comprising:
executing a non-privileged disable interrupts instruction in user space to disable interrupts, wherein the non-privileged disable interrupts instruction has a non-zero operand value;
after executing the non-privileged disable interrupts instruction, executing a non-privileged spin-lock request in user space for a corresponding code segment;
in response to obtaining the spin-lock, executing the corresponding code segment;
in response to completing execution of the corresponding code segment, releasing the spin-lock; and
after releasing the spin-lock, executing a non-privileged enable interrupts instruction in user space to enable interrupts.

8. The method of claim 7, wherein executing the non-privileged disable interrupts instruction comprises:
disabling interrupts based on the non-zero operand value in the non-privileged disable interrupts instruction;
placing the non-zero operand value in a special purpose register associated with disabling interrupts; and
executing a countdown timer.

9. The method of claim 8, wherein executing the non-privileged enable interrupts instruction comprises:
enabling interrupts based on a zero operand value in the non-privileged enable interrupts instruction;
placing the zero operand value in the special purpose register associated with disabling interrupts; and
cancelling the countdown timer.

10. The method of claim 8, wherein executing the countdown timer comprises, for each clock cycle:
determining the value in the special purpose register associated with disabling interrupts;
in response to determining that the value in the special purpose register associated with disabling interrupts is non-zero, decrementing the value in the special purpose register associated with disabling interrupts; and
in response to determining that the value in the special purpose register associated with disabling interrupts is zero, enabling interrupts.

11. The method of claim 10, wherein executing the countdown timer further comprises:
in response to determining that the value in the special purpose register associated with disabling interrupts is zero, communicating a raised exception to a user.

12. The method of claim 7, wherein the non-privileged disable interrupts instruction expects an immediate mode operand having a predetermined bit size.

13. A processor core comprising:
a control unit configured to receive and decode a non-privileged disable interrupts instruction having an operand value which represents an estimate of an amount of time to disable interrupts; and
a plurality of registers, wherein one of the plurality of registers is a first special purpose register associated with the non-privileged disable interrupts instruction for storing the operand value from the non-privileged disable interrupts instruction.

14. The processor core of claim 13, further comprising circuitry associated with the first special purpose register and configured to periodically decrement the operand value stored in the first special purpose register.

15. The processor core of claim 14, wherein the circuitry associated with the first special purpose register is further configured to enable interrupts and raise an exception in response to determining that the operand value stored in the first special purpose register associated with the non-privileged disable interrupts instruction has been decremented to zero.

16. The processer core of claim 14, wherein the circuitry associated with the first special purpose register is configured to periodically decrement the operand value at a frequency scaled proportionally to a clock rate of a clock in the processor core.

17. The processor core of claim 16, further comprising:
a second special purpose register configured to store a value representative of an estimate of a number of central processing unit (CPU) time cycles consumed by a running thread; and
an oscillator associated with the second special purpose register and configured to trigger increments in the value stored in the second special purpose register at a frequency which is proportional to the clock rate of the clock;
wherein the circuitry associated with the first special purpose register is configured to decrement the value stored in the first special purpose register in lock-step with each increment of the second special purpose register.

18. A computer system comprising:
a memory configured to store a user application;
one or more processors communicatively coupled to the memory and configured to execute the user application in user space, each of the one or more processors having one or more cores;
wherein each of the one or more cores comprises:
a control unit configured to receive and decode a respective non-privileged disable interrupts instruction of the user application, the respective non-privileged disable interrupts instruction having a respective operand value which represents a respective estimate of an amount of time to disable interrupts; and
a plurality of registers, wherein one of the plurality of registers is a first special purpose register configured to store the operand value from the respective non-privileged disable interrupts instruction.

19. The computer system of claim 18, wherein each of the one or more processors is configured to:
determine the respective operand value in the respective non-privileged disable interrupts instruction;
in response to determining that the respective operand value is a non-zero value, determine a value in the first special purpose register; and
in response to determining that the value in the first special purpose register is zero, disable interrupts and place the non-zero operand value in the first special purpose register.

20. The computer system of claim 19, wherein each of the one or more processors is further configured to enable interrupts and place a zero value in the first special purpose register in response to receiving a respective non-privileged enable interrupts instruction.

21. The computer system of claim 18, wherein each of the one or more cores further comprises circuitry associated with the first special purpose register;
wherein, for each clock cycle, the circuitry associated with the first special purpose register is configured to:
determine the value in the first special purpose register;
in response to determining that the value in the first special purpose register is non-zero, decrement the value in the first special purpose register; and
in response to determining that the value in the first special purpose register is zero, enable interrupts.

22. A computer program product comprising a computer readable storage medium having a computer readable program stored therein, wherein the computer readable program, when executed by a processor, causes the processor to:

execute a non-privileged disable interrupts instruction in user space to disable interrupts, wherein the non-privileged disable interrupts instruction has a non-zero operand value;

execute a non-privileged spin-lock request in user space for a corresponding code segment after executing the non-privileged disable interrupts instruction;

in response to obtaining the spin-lock, execute the corresponding code segment;

in response to completing execution of the corresponding code segment, release the spin-lock; and after releasing the spin-lock, execute a non-privileged enable interrupts instruction in user space to enable interrupts.

23. The computer program product of claim 22, wherein the computer readable program is further configured to cause the processor to execute the non-privileged disable interrupts instruction by:

disabling interrupts based on the non-zero operand value in the first non-privileged disable interrupts instruction;

placing the non-zero operand value in a special purpose register associated with disabling interrupts; and executing a countdown timer.

24. The computer program product of claim 23, wherein the computer readable program is further configured to cause the processor to execute the non-privileged enable interrupts instruction by:

enabling interrupts;

resetting the special purpose register associated with disabling interrupts; and cancelling the countdown timer.

25. The computer program product of claim 23, wherein the computer readable program is further configured to cause the processor to execute the countdown timer by, for each clock cycle:

determining the value in the special purpose register associated with disabling interrupts;

in response to determining that the value in the special purpose register associated with disabling interrupts is non-zero, decrementing the value in the special purpose register associated with disabling interrupts; and in response to determining that the value in the special purpose register associated with disabling interrupts is zero, enabling interrupts.

\* \* \* \* \*